United States Patent
Kumashiro et al.

(10) Patent No.: US 8,421,418 B2
(45) Date of Patent: Apr. 16, 2013

(54) CHARGING/DISCHARGING CONTROL UNIT FOR LITHIUM SECONDARY BATTERY

(75) Inventors: Yoshiaki Kumashiro, Mito (JP); Yoshimi Yanai, Kitaibaraki (JP); Eiji Seki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 722 days.

(21) Appl. No.: 12/541,612

(22) Filed: Aug. 14, 2009

(65) Prior Publication Data

US 2010/0072949 A1    Mar. 25, 2010

(30) Foreign Application Priority Data

Sep. 25, 2008    (JP) ................. 2008-245892

(51) Int. Cl.
*H02J 7/00*    (2006.01)
(52) U.S. Cl.
USPC ....................................................... 320/135
(58) Field of Classification Search .................... 320/135
See application file for complete search history.

(56) References Cited

U.S. PATENT DOCUMENTS

| | | | |
|---|---|---|---|
| 7,026,792 B2 * | 4/2006 | Murakami et al. | 320/135 |
| 7,034,506 B2 * | 4/2006 | Chen et al. | 320/136 |
| 7,459,886 B1 * | 12/2008 | Potanin et al. | 320/135 |
| 7,598,706 B2 * | 10/2009 | Koski et al. | 320/117 |
| 2008/0180061 A1 * | 7/2008 | Koski et al. | 320/117 |

FOREIGN PATENT DOCUMENTS

JP    2005-294028 A    10/2005

* cited by examiner

*Primary Examiner* — Ramy Ramadan
(74) *Attorney, Agent, or Firm* — Crowell & Moring LLP (57) ABSTRACT

In a charging/discharging unit provided with: a lithium secondary battery, a voltage detecting sensor for detecting a voltage and a current detecting sensor; the charging/discharging control unit is further provided with a controller, and a discharging element for performing a constant voltage discharging operation of 3 V. A voltage, V0, of the battery when a discharging operation is terminated (t=0) is measured by the voltage detecting sensor. If V0≦3.6 V, within a rest time during which the battery is not charged/discharged until a next charging operation, a voltage, V1, of the battery when a time, t1, has elapsed is measured by the voltage detecting sensor. If this voltage charge is in a range of V1-V0≧0.2 V, then the constant voltage discharging operation of 3 V is carried out for a time duration longer than or equal to 1 hour.

6 Claims, 3 Drawing Sheets

CHARGING/DISCHARGING CONTROL UNIT FOR LITHIUM SECONDARY BATTERY

BACKGROUND OF THE INVENTION

1. Field of the Invention

The present invention is related to a charging/discharging control unit used for a lithium secondary battery.

2. Description of the Related Art

In view of environmental aspects, specific attentions have been paid to lithium secondary batteries functioning as electric vehicle-purpose batteries and electronic power storage-purpose batteries. In their utilization fields, high energy density and long lifetime are required. As to the long lifetime, 1,000, or more cycles of charging/discharging repetitions are required. In conventional lithium secondary batteries, graphite materials have been employed for negative electrodes thereof in order to realize a high energy density. However, the lithium secondary batteries in which the graphite materials have been employed for the negative electrode thereof have such a problem that cycle lifetime thereof becomes short.

Conventionally, the below-mentioned technical ideas are known with respect to such lithium secondary batteries that graphite materials have been employed for negative electrodes thereof: That is, in the above-descried lithium batteries, by setting discharge termination potentials of the negative electrodes lower than or equal to "0.5 V vs. $Li/Li^+$", it is possible to avoid a rapid volume change of the negative electrode, which occurs in the last stages of battery discharging operation, and it is therefore possible to improve cycle lifetimes of the above-described conventional lithium secondary batteries (refer to, for instance, JP-A-2005-294028). However, in JP-A-2005-294028, in order to set the discharge termination potential of the negative electrode to be lower than or equal to "0.5 V vs. $Li/Li^+$", lithium must be previously doped in the negative active material. In order to dope lithium to the negative active material, complex manufacturing steps are necessarily required, since metal lithium foils are assembled in the lithium secondary battery. Also, another negative active material capable of accepting lithium from the positive electrode is required in addition to the lithium which has been previously doped. As a result, there exists such a problem that a total utilization amount of the negative active materials is increased.

SUMMARY OF THE INVENTION

As a result of investigations with respect to reasons why the cycle lifetime of lithium secondary batteries in which the graphite material has been employed for the negative electrode thereof are shortened, Inventors of the present invention found a fact that even if charging/discharging cycles are repeated under the same charging/discharging conditions, the voltage of the battery when the charging operation is commenced is increased at every cycle. If the battery voltage is increased when the charging operation is commenced, a voltage difference between a voltage when a charging operation is ended is decreased, so that a rechargeable electricity amount is reduced, and a dischargeable capacity is also reduced. If the above-explained phenomenon repeatedly occurs, a discharge capacity of the lithium secondary battery is decreased.

Then, as to the reason why the voltage when the charging operation is commenced is increased, Inventors of the present invention investigated the above-explained reason in comparison with amorphous carbon, for which it has been known that the above-described phenomenon can hardly occur as compared with the graphite material. A 3-electrode type test cell was manufactured and charging/discharging cycle tests between 0.01 V and 1 V vs. $Li/Li^+$ were performed. In the 3-electrode type test cell, while a counter electrode and a reference electrode were made of metal lithium, either a negative electrode composed of a graphite material or a negative electrode composed of amorphous carbon was employed for a test electrode. At this time, a rest time for 30 minutes was provided between the charging/discharging operations. As a result, it was revealed that for the negative electrode made of the graphite material, a potential change during the rest time is increased at every cycle, whereas for the negative electrode made of amorphous carbon, a potential change during the rest time is considerably decreased as compared with that of the graphite material. This result is identical to an investigation result obtained by investigating an actual lithium secondary battery, and thus, it can be revealed that the increase of the voltage of the lithium secondary battery when the charging operation is commenced is influenced by the fact that the graphite material is used as the negative electrode. After the cycle test was accomplished and the test cell was dismantled, when the negative electrode was taken out, colors of electrode surfaces of the negative electrode made of the graphite material were gold, dark blue, and black, being different depending on portions thereof. It is known that the colors of the graphite are different at every potential in response to an amount of the $Li^+$ ions intercalated into the graphite material, so that such a color pattern formed on the electrode surface indicates that graphite materials containing different amounts of $Li^+$ ions coexist in the negative electrode.

Figure 1:
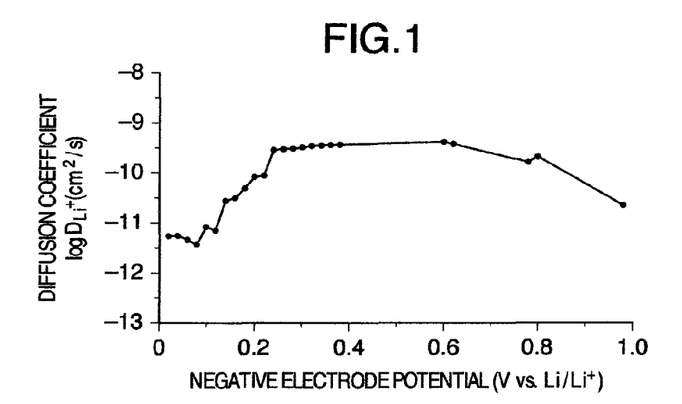
FIG. 1 is a graph representing a relationship between a potential of a graphite material of a negative electrode of a lithium secondary battery and a diffusion coefficient.
Figure 2:
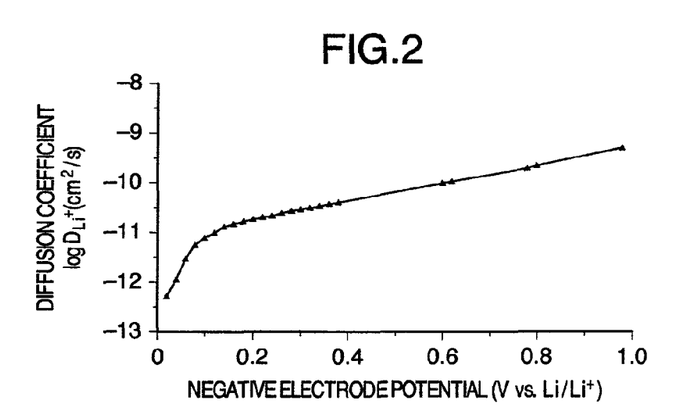
FIG. 2 is a graph representing a relationship between a potential of an amorphous carbon material of a negative electrode of a lithium secondary battery and a diffusion coefficient.

Investigations were carried out with respect to a potential dependence of diffusion coefficients of $Li^+$ ions for both graphite material and amorphous carbon, and results were obtained as represented in FIG. 1 and FIG. 2. As shown in FIG. 1, at a potential lower than 0.22 V vs. $Li/Li^+$, the diffusion coefficient of the $Li^+$ ions of graphite material is small, so that the diffusion is slow. On the other hand, as indicated in FIG. 2, at a potential lower than 0.1 V vs. $Li/Li^+$, the diffusion coefficient of the $Li^+$ ions of amorphous carbon is small, so that the diffusion is slow.

Figure 3:
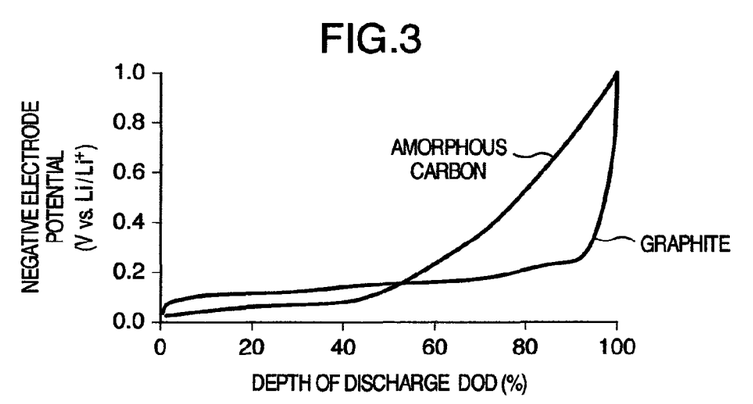
FIG. 3 is a graph representing potential changes with respect to depths of discharge as to the graphite material of the negative electrode and the amorphous carbon material of the negative electrode.

Also, discharge curves (namely, potential changes with respect to depths of discharge) for graphite material and amorphous carbon are represented in FIG. 3. The potentials of the negative electrodes is described as follows: While $Li^+$ ions have a negative potential of approximately −3 V, if the $Li^+$ ions are diffused in the negative electrode during a charging stage, then the potential of the negative electrode is lowered, and the potential of the negative electrode is increased in a diffusion stage. Next, while the depth of discharge represents a discharge degree of a lithium secondary battery, it is assumed that, for instance, a situation that the lithium secondary battery has been fully charged up to 0.01 V vs. $Li/Li^+$ is defined as the discharge depth of 0%, whereas a situation that the lithium secondary battery is fully discharged from the fully charged situation up to 1 V vs. $Li/Li^+$ is defined as the discharge depth of 100%. A situation of the discharge depth of 20% implies such a situation that an electricity amount of 20% is discharged from the fully charged situation, whereas a situation of the discharge depth of 80% implies such a situation that an electricity amount of 80% is discharged from the fully charged situation. A depth of discharge is abbreviated as DOD (Depth of Discharge).

The above-described region where the $Li^+$ ions were slowly diffused was DOD<80% in the graphite material. In other words, as to the graphite material, the discharge capacity is approximately 80% in the region where the ion diffusion is slow, whereas the discharge capacity is only approximately 20% in the region where the ion diffusion is fast.

Because of the above-explained reason, in the graphite material, when a potential at a portion in the electrode exceeds 0.22 V vs. Li/Li$^+$, the discharge capacity is small and the potential increase becomes fast. However, the graphite material, which occludes the Li$^+$ ions up to such regions whose potentials are lower than 0.22 V vs. Li/Li$^+$ where the diffusion is slow, are still present in the electrode. As a result, graphite materials whose Li$^+$ ion amounts are different from each other are located within the electrode in the mixed manner, so that a potential distribution may occur. Since the potential of the electrode is equal to a potential average at the graphite materials whose Li$^+$ ion amounts are different from each other, if the regions are increased where the ion diffusion is slow and whose potential are lower than 0.22 V vs. Li/Li$^+$, then the potential of electrode under rest is also left in the vicinity of 0.22 V vs. Li/Li$^+$, so that the potential when the charging operation is started is lowered. Since the voltage of the lithium secondary battery is equal to a difference between the potential of the positive electrode and the potential of the negative electrode, a phenomenon that the potential of the negative electrode is lowered implies that the voltage of the lithium secondary battery becomes high. As a result, a sufficiently high rechargeable voltage cannot be secured.

To the contrary, in the amorphous carbon, the depth of discharge at a potential lower than or equal to 0.1 V vs. Li/Li$^+$ in the region where the ion diffusions are slow is DOD<40%, and also, the discharge capacity within the region where the ion diffusions are fast is approximately 60%. As a result, the potential distribution within the electrode can be resolved during this discharge time, so that the potential change during the rest time is small.

An object of the present invention is to solve the above-described problems and to provide a charge/discharge control unit capable of suppressing an occurrence of the region where ions are slowly diffused within the negative electrode made of graphite so as to prevent lowering of the potential at the negative electrode, and capable of prolonging the cycle lifetime of the lithium secondary battery.

To solve the above-described problem, a charge/discharge control unit of the lithium secondary battery, according to an aspect of the present invention, is featured by comprising: a lithium secondary battery having a positive electrode and a negative electrode which are capable of charging/discharging electric charges, and an electrolytic solution containing lithium ions; a voltage detecting sensor for detecting the voltage of the lithium secondary battery; and a current detecting sensor for detecting charging/discharging currents of the lithium secondary battery; in which the charging/discharging control unit of the lithium secondary battery is further comprised of a controller for controlling the discharge voltage of the lithium secondary battery; and a discharging element for performing a constant voltage discharging operation of the lithium secondary battery; and it is characterized that in a case that a voltage, V0, of the lithium secondary battery when the discharging operation is terminated becomes V0≦Vcut with respect to a reference voltage, Vcut, if a voltage change, V1-V0, after a time, t1, has elapsed from the termination of the discharging operation is larger than or equal to a predetermined value, ΔV, then the controller causes the discharging element to perform the constant voltage discharging operation at a voltage, Vd, for a predetermined time during a rest time until a subsequent charging operation is commenced.

Also, the charging/discharging control unit is featured by that a positive active material of the lithium secondary battery is a composite oxide composed of a transition metal and lithium which is inserted/released in a region where a potential with respect to metal lithium is higher than or equal to 3 V, and is lower than or equal to 5 V; the negative active material contains at least graphite having a spacing, d002, between (002) planes of 0.335 to 0.349 nm as determined from an X-ray diffracting method; and among discharge capacities between 0.01 V and 1 V vs. Li/Li$^+$ when the charging/discharging operations are performed by employing the negative active material in the negative electrode and the lithium metal in the counter electrode, a discharge capacity ratio, Cm2/Cm1, is in a range of Cm2/Cm1<0.4, where a discharge capacity between 0.01 to 0.2 V vs. Li/Li$^+$ is set to Cm1, and another discharge capacity between 0.2 to 1 V vs. Li/Li$^+$ is set to Cm2. Here, the charging/discharging control unit is featured by that the positive active material of the lithium secondary battery contains at least a lithium-manganese composite oxide. Furthermore, the charging/discharging control unit is featured by that a positive active material of the lithium secondary battery contains a lithium-manganese composite oxide having the spinel structure, and another composite oxide containing lithium having a layer structure containing nickel and manganese; and among discharge capacities between 3.0 V and 4.2 V vs. Li/Li$^+$ when the charging/discharging operations are performed by employing the positive active material for the positive electrode and the lithium metal for the counter electrode, a discharge capacity ratio, Cp2/Cp1, is Cp2/Cp1<0.5, where a discharge capacity between 3.8 to 4.2 2 V vs. Li/Li$^+$ is set to Cp1, and another discharge capacity between 3.0 to 3.8 V vs. Li/Li$^+$ is set to Cp2.

Also, the charging/discharging control unit is featured by that the positive active material of the lithium secondary battery is a composite oxide composed of a transition metal and lithium which undertakes intercalation/deintercalation in a region where a potential with respect to metal lithium is higher than or equal to 3 V, and is lower than or equal to 5 V; a negative active material contains graphite having a spacing between (002) planes, d002, of 0.335 to 0.349 nm as determined from the X-ray diffracting method, amorphous carbon having a spacing between (002) planes, d002, of 0.350 to 0.390 nm as determined from the X-ray diffracting method; and among discharge capacities between 0.01 and 1 V vs. Li/Li$^+$ when the charging/discharging operations are performed by employing the negative active material for the negative electrode and lithium metal for a counter electrode, a discharge capacity ratio, Cm2/Cm1, is in a range of Cm2/Cm1<0.4, where a discharge capacity between 0.01 to 0.2 V vs. Li/Li$^+$ is set to Cm1, and another discharge capacity between 0.2 to 1 V vs. Li/Li$^+$ is set to Cm2. In this case, the charging/discharging control unit is featured by that the positive active material of the lithium secondary battery at least contains a lithium-manganese composite oxide. Furthermore, the charging/discharging control unit is featured by that a positive active material of the lithium secondary battery contains a lithium-manganese composite oxide having the spinel structure, and another composite oxide containing lithium having a layer structure containing nickel and manganese; and among discharge capacities between 3.0 and 4.2 V vs. Li/Li$^+$ when the charging/discharging operations are performed by employing the electrode active material for the positive electrode and the lithium metal for the counter electrode, a discharge capacity ratio, Cp2/Cp1, is in a range of Cp2/Cp1<0.5, where a discharge capacity between 3.8 to 4.2 2 V vs. Li/Li$^+$ is set to Cp1, and another discharge capacity between 3.0 to 3.8 V vs. Li/Li$^+$ is set to Cp2.

Also, in a method for controlling the charging/discharging control unit comprising: a lithium secondary battery having a positive electrode and a negative electrode which are capable of charging/discharging electric charges and an electrolytic solution containing lithium ions; a voltage detecting sensor for detecting the voltage of the lithium secondary battery; a current detecting sensor for detecting the charging/discharging currents of the lithium secondary battery; a controller for controlling a discharge voltage of the lithium secondary battery; and a discharging element for performing a constant voltage discharging operation of the lithium secondary battery; it is characterized that in a case that a voltage, V0, of the lithium secondary battery when the discharging operation is terminated becomes V0<Vcut with respect to a reference voltage, Vcut, if a voltage change, V1-V0, after a time, t1, has elapsed from the termination of the discharging operation is larger than or equal to a predetermined value, $\Delta V$, then the discharging element performs the constant voltage discharging operation at a voltage, Vd, for a time longer than a predetermined time during a rest time until a subsequent charging operation is commenced.

According to the charge/discharge control unit for the lithium secondary battery of the present invention, the cycle lifetime of the lithium secondary battery can be prolonged.

Other objects, features and advantages of the invention will become apparent from the following description of the embodiments of the invention taken in conjunction with the accompanying drawings.

DETAILED DESCRIPTION OF THE INVENTION

Figure 4:
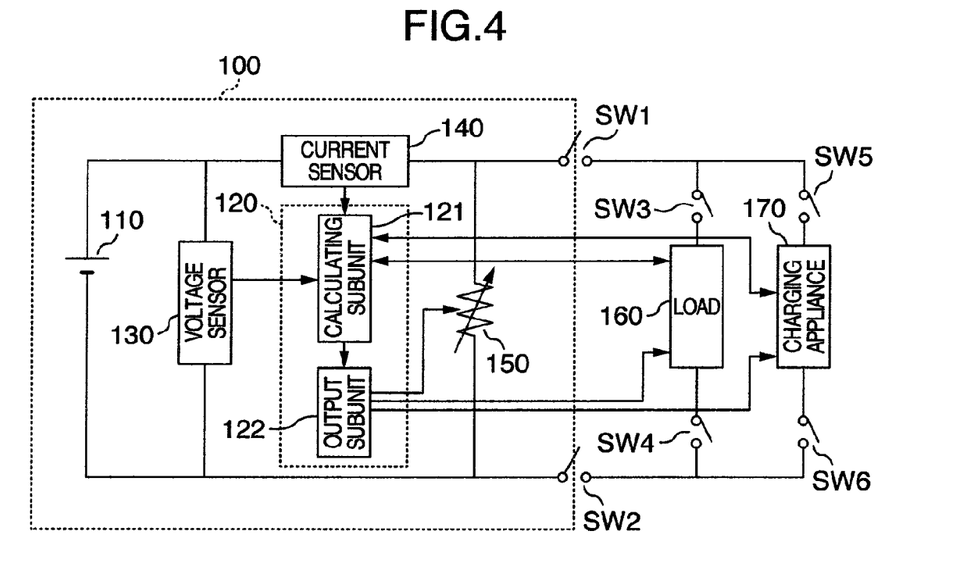
FIG. 4 is a system block diagram representing an arrangement of a charging/discharging unit for a lithium secondary battery according to an embodiment of the present invention.
Figure 5:
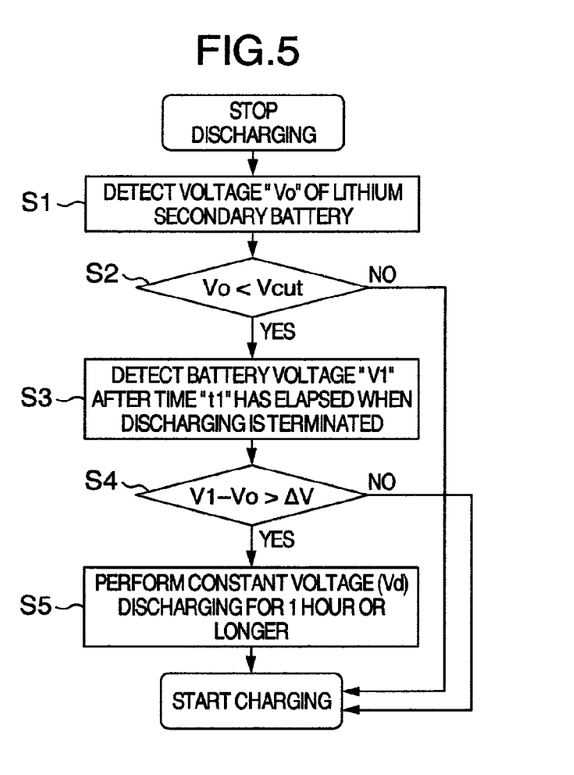
FIG. 5 is a flow chart representing operations of a calculating subunit provided in the charge/discharge control unit for the lithium secondary battery according to the embodiment of the present invention.

Referring now to FIG. 4 and FIG. 5, a description is made of an arrangement and operations of the charging/discharging control unit according to an embodiment of the present invention. It should be understood that the present invention is not limited only to the embodiment modes described below.

FIG. 4 is a system block diagram representing a charging/discharging control unit 100 of a lithium secondary battery, according to one embodiment of the present invention. The charging/discharging control unit 100 of the lithium secondary battery, according to the present embodiment, is provided with a lithium secondary battery 110, a controller 120, a voltage sensor 130, a current sensor 140, and a variable resistor 150. The voltage sensor 130 corresponds to a voltage detecting sensor for detecting the voltage of the lithium secondary battery 110. The current sensor 140 corresponds to a current detecting sensor for detecting charging/discharging currents of the lithium secondary battery 110. The variable resistor 150 corresponds to a discharging element. The lithium secondary battery 110 corresponds to an electricity dischargeable storage device which can store thereinto electric charges. Reference numeral 160 indicates a load connected via switches SW3 and SW4 to the charging/discharging control unit 100. Reference numeral 170 indicates a charging appliance which is similarly connected via switches SW5 and SW6 to the charging/discharging control unit 100. The load 160 and the charging appliance 170 are connected via switches SW1 and SW2 to the charging/discharging control unit 100.

[Positive Electrode of Battery]

A positive electrode of the lithium secondary battery 110 is composed of a positive active material, an electric conductive agent, a binder, and a collector. The positive active material, which can be used in the present invention, is made of oxides containing lithium. The following oxide containing lithium may be employed, for instance, oxides having layer structures such as $LiCoO_2$, $LiNiO_2$, $LiMn_{1/3}Ni_{1/3}Co_{1/3}O_2$, $LiMn_{0.4}Ni_{0.4}Co_{0.2}O_2$ may be employed; lithium/manganese composite oxides having the spinel structure such as $LiMn_2O_4$ and $Li_{1+x}Mn_{2-x}O_4$, and also oxides in which Mn is partially substituted by other elements such as Al and Mg. Generally speaking, since a positive active material has a high resistance value, carbon powder is mixed into the positive active material as an electric conducting agent in order to compensate the electric conductivity. Since both the positive active material and the electric conducting agent are made of powder, a binder is mixed into the powder, and the powder with binder is coupled to each other, and at the same time, this powder layer is adhered to the collector. As the above-explained electric conducting agent, natural graphite, artificial graphite, coke, carbon black, amorphous carbon, and other elements may be employed. If an average particle diameter of the electric conducting agent is made smaller than an average particle diameter of the positive active material powder, then the electric conducting agent may be easily adhered to the surfaces of the positive active material. As a result, an electric resistance value of the positive electrode may often be reduced by employing a small amount of electric conducting agents. As a consequence, the electric conducting agent may be properly selected based upon the averaged particle diameters of positive active materials. Materials which can be hardly solved into an electrolytic solution may be employed as the collector of the positive electrode, and in many cases aluminum foils have been utilized. The positive electrode can be manufactured by a doctor blade method in which positive electrode slurry is coated onto the collector by employing a blade, while the positive electrode slurry is made by mixing the positive active material, the electric conducting agent, the binder, and an organic solvent with each other.

The positive electrode manufactured in this manner is heated so as to dry the organic solvent, and pressure is applied to the positive electrode by a roll press so as to mold the positive electrode, and thereafter, the collector is closely contacted to an adhesive agent of the positive electrode. It should be understood that with respect to the positive active materials, in view of safety and amount of deposits which is related to cost, it is desirable that 70% or more in weight of the lithium/manganese composite oxide having the spinel structure have been contained in the positive active material. A ratio of the lithium/manganese composite oxide having the spinel structure with respect to the positive active materials can be confirmed by checking the discharge capacity ratio, Cp2/Cp1, which is a ratio of a discharge capacity, Cp1, between 3.8 and 4.2 V vs. $Li/Li^+$ to a discharge capacity, Cp2, between 3.0 and 3.8 V vs. $Li/Li^+$ among a range of discharge capacities when charging/discharging operations are carried out between 3.0 and 4.2 V vs. Li/Li$^+$, when lithium metal is employed as the opposite electrode. In a case that 50% or more in weigh of the lithium-manganese composite oxide having the spinel structure is contained in the active materials, a discharge capacity ratio becomes Cp2/Cp1<0.5.

[Negative Electrode of Battery]

The negative electrode of the lithium secondary battery 110 is composed of a negative active material, a binder, and a collector. According to the present invention, although graphite and amorphous carbon, which are capable of occluding/discharging lithium in an electrical chemical manner, may be utilized in the negative electrode, if materials can charge and discharge electric energy, then there is no limitation in sorts of the negative active materials. Since, generally speaking, negative active materials are utilized under powder condition in many cases, a binder is mixed in the powder active material so as to couple the powder to each other, and at the same time, this powder layer is adhered to the collector. The material for the collector of the negative electrode has such a restriction condition that the collector material can be hardly alloyed with lithium, and in many cases, copper foils are employed. The negative electrode can be manufactured by a doctor blade method, in which negative electrode slurry made by mixing the negative active material, the binder, and an organic solvent with each other, is adhered onto the collector. Thereafter, the organic solvent is dried, and pressure is applied to the negative electrode by a roll press so as to mold the negative electrode.

It should also be noted that in order to increase the energy density of the lithium secondary battery 110, it is desirable that 60% or more in weight of graphite is contained with respect to the total weight of the negative active materials. A ratio of graphite with respect to the negative active materials can be confirmed by checking the capacity ratio, Cm2/Cm1, which is a ratio of a discharge capacity, Cm1, between 0.01 and 0.2 V vs. Li/Li$^+$ to a discharge capacity, Cm2, between 0.2 and 1 V vs. Li/Li$^+$ among a range of discharge capacities when charging/discharging operations are carried out between 0.01 and 1 V vs. Li/Li$^+$, when a lithium metal is employed as the opposite electrode. In a case that 60% or more in weight of graphite is contained in the active materials, the discharge capacity ratio becomes Cm2/Cm1<0.4.

Separator

A polymer-series separator made of polyethylene, polypropylene, ethylene tetra-fluoride, and the like, is interposed between the positive electrode and the negative electrode, which have been manufactured in the above-described manner, and then, a sufficiently large amount of electrolytic solution is held between the separator and the positive/negative electrodes. As a result, while electric insulation between the positive electrode and the negative electrode can be maintained, lithium ions can be given and received between the positive electrode and the negative electrode. In the case of a cylindrical type battery, under a condition that the separator is interposed between the positive electrode and the negative electrode, they are wound so as to manufacture an electrode group. Instead of the above-described separator, either a seat solid-state electrolytic material or a gel electrolytic material may be utilized, in which either lithium chloride or a non-aqueous electrolytic solution is held in polymers such as polyethylene oxide (PEO), polymethacrylate (PMMA), polyacrylonitrile (PAN), polyvinyliden fluoride (PVdF), and polyvinyliden fluoride-hexafluoro propylene copolymer (CPVdF-HFP).

Also, when an electrode is wound on two axes, a flat oval type electrode group may be obtained. In the case of a square type battery, a positive electrode and a negative electrode are cut in a paper strip shape; the cut positive electrodes and the cut negative electrodes are alternately stacked on each other; and polymer-series separators are interposed among the respective stacked electrodes so as to manufacture an electrode group, and the polymer-series separators are made of polyethylene, polypropylene, ethylene tetra-fluoride, and the like. Since the inventive idea of the present invention has no direct relationship with the structures of the above-described electrode groups, the inventive idea may be applied to an arbitrary structure of an electrode group, Furthermore, as preferable electrolytic solutions, such solutions may be employed mixed with at least one sort, or more sorts of solvents selected from; propylene carbonate, butylene carbonate, dimethyl carbonate, ethyl/methyl carbonate, diethyl carbonate, methyl acetate, ethyl acetate, propyl acetate, methyl methanoate, ethyl methanoate, propyl methanoate, γ-butyrolactone, α-acetyl-γ-butyrolactone, α-methoxy-γ-butyrolactone, dioxolane, sulfulane, and ethylene sulfate. An electrolytic solution may be employed in which lithium salt electrolytic materials are contained in these solvents in volume concentration of 0.5 M to approximately 2 M, where the lithium salt electrolytic materials are selected from LiPF$_6$, LiBF$_4$, LiSO$_2$CF$_3$, LiN[SO$_2$CF$_3$]$_2$, LiN[SO$_2$CF$_2$CF$_3$]$_3$, LiB[OCOCF$_3$]$_4$, LiB[OCOCF$_2$CF$_3$]$_4$, and the like.

After the manufactured electrode group is inserted into such a battery can made of aluminum, stainless steel, or nickel-plated steel, an electrolytic solution is osmosed to the electrode group. As to the shapes of the battery can, there are cylindrical type, flat elliptic type, square type, and the like. As long as the electrode group can be contained, any of these shapes of battery cans may be selected.

Controller

The controller 120 is provided with a calculating subunit 121 and an output subunit 122. The calculating subunit 121 judges situation of the lithium secondary battery 110 based upon voltage data detected by the voltage sensor 130, and current data detected by the current sensor 140. The output subunit 122 outputs a judged result obtained from the calculating subunit 121 via a communication line to the discharging element 150 in order to control this discharging element 150.

The calculating subunit 121 may be a controller, a computer system, or a microcomputer, which is composed of a storage device, a CPU, and the like, and such means may be available that information can be inputted to calculate it and a calculated result can be outputted. Also, the various sorts of sensors and the calculating subunit 121 may be alternatively implemented as a microcomputer which is constructed on the same device.

The output subunit 122 is a subunit for transmitting a result of condition sensing of the lithium secondary battery 110 judged by the calculating subunit 121 to an external unit (not shown). As the output subunit 122, in addition to the subunit for outputting the information to the communication line, any other output subunit for outputting the information by utilizing either a wired communication or a wireless communication such as a network and a wireless LAN may be employed. Furthermore, a display element may be alternatively contained in the above-described output subunit 122, and any sorts of means capable of outputting the result judged by the calculating subunit 121 to the external unit may be employed.

FIG. 5 is a flow chart representing a calculating process operation executed by the calculating subunit 121 employed for the charging/discharging control unit 100 according to the present embodiment of the present invention. Firstly, in a step S1 of the flow chart, a voltage, V0, of the lithium secondary battery 110 (referred to as "battery voltage V0" hereinafter) when a discharging operation is accomplished is detected. Next, in a step S2, the calculating subunit 121 judges whether or not the lithium secondary battery 110 has been discharged until the battery voltage, V0, becomes lower than or equal to a reference voltage, Vcut. If V0>Vcut, then the charging/discharging operation is brought into a rest condition until the subsequent charging operation is commenced. In a case that V0≦Vcut, a batter voltage, V1, when a time, t1, elapses after the completion of discharging is detected in a step S3. In a step S4, the calculating subunit 121 calculates a voltage change, V1-V0, during the time, t1, so as to judge whether or not V1-V0>ΔV.

Generally speaking, in a lithium secondary battery, lower limit values of discharge voltages within a range defined between 2.5 V and 3.0 V are used in order to prevent an over-discharging operation. In the lithium secondary battery 110 in which the graphite material is utilized in the negative electrode, being the subject of the present invention, it is preferable that the lower limit value of the discharge voltage is set to 3.0 V. Also, it is preferable that the reference voltage, Vcut, is set to 3.0 V≦Vcut≦3.6 V, and if the reference voltage, Vcut, becomes lower than or equal to approximately 3.6 V, the battery voltage thereof is largely lowered within a short time, so that it is most preferable that the reference voltage, Vcut, is equal to 3.6 V. If the reference voltage is set as, Vcut, >3.6 V, a change in the battery voltages is small, so that the effect of the present invention cannot be sufficiently achieved.

Further, as to ΔV, it is preferable to set as ΔV=0.2 V. In this case, if the time, t1, is too short, then the calculating subunit 121 judges the voltage change smaller than the actual voltage change, whereas if the time, t1, is too long, then the charging time can be hardly secured, resulting in an improper effect. Accordingly, it is preferable that the time, t1, is set between 5 minutes and 30 minutes. If V1-V0>ΔV, then a constant voltage discharging operation of Vd is carried out in a step S5. The constant voltage, Vd, may be set within a range of 3.0≦Vd<Vcut. It is more preferable that the constant voltage "Vd" is set to be equal to 3.0 V.

This constant voltage discharging operation has a purpose of resolving a potential distribution within the electrode caused by $Li^+$ ion diffusion occurred in the negative electrode. A time required for the constant voltage discharging operation is set to be longer than or equal to 1 hour. It is desirable that the constant voltage discharging operation is carried out for a long time, so that it is preferable that it is carried out until just before a subsequent charging operation is commenced. In an actual case, in order that the charging time is secured, it is practically preferable to set approximately 1 hour through 2 hours as the time required for the constant voltage discharging operation.

In order to perform cycle tests by employing the charging/discharging control unit 100 of the lithium secondary battery 110, according to the present invention, coin type lithium secondary batteries as shown in Embodiment 1 to Embodiment 4, and Comparison example 1 to Comparison example 4, were manufactured. It should also be noted that lithium secondary batteries for which the charging/discharging control unit 100 of the lithium secondary battery can be provided, according to the present invention, are not limited only to the following embodiments.

Embodiment 1

Figure 6:
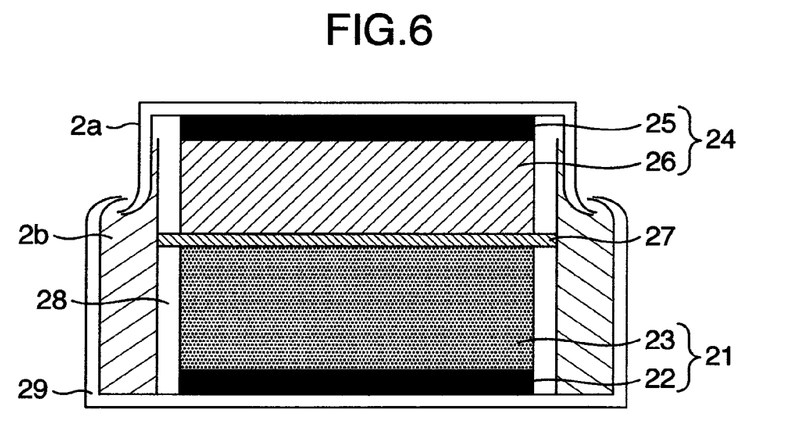
FIG. 6 is a cross-sectional view of a coin type lithium secondary battery.

A coin type lithium secondary battery having such a structure shown in FIG. 6 was manufactured. A positive electrode 21 thereof was manufactured in the following manner: A positive active material applied in the present embodiment 1 was $Li_{1.05}Mn_{1.95}O_4$ having an average particle diameter of 20 μm, and as an electric conducting assisting agent, natural graphite having an average particle diameter of 3 μm and a specific surface area of 13 m²/g was mixed with carbon black having an average particle diameter of 0.04 μm and a specific surface area of 40 m²/g in a weight ratio of 4:1. As a binding agent, a solution that 8 wt % of polyvinyliden fluoride was previously solved into N-methylpyrolidone was employed. The above-explained positive active material, the electric conducting assisting agent, and the polyvinyiliden fluoride solution were mixed with each other in a weight ratio of 90:4:6, and then sufficiently kneaded, and thus positive electrode slurry was made. This positive electrode slurry was coated on a single plane of a positive electrode collector 22 made of an aluminum foil having a thickness of 20 μm, and was dried. The positive electrode collector 22 coated with the dried positive electrode slurry was pressed by utilizing a roll press so as to manufacture an electrode. The manufactured electrode was punched into a disk-shaped electrode having a diameter of 16 mm to construct the positive electrode 21. The positive electrode 21 is composed of the positive electrode collector 22 and the positive electrode components layer 23. The positive electrode components layer 23 consists of a mixture of active materials, electric conducting assisting agent, and polyvinyliden fluoride. A negative electrode 24 was manufactured according to the following method.

As a negative active material, graphite having an averaged particle diameter of 10 μm was mechanically mixed with carbon black having an average particle diameter of 0.04 μm and a specific surface area of 40 m²/g in a weight ratio of 95:5. As a binding agent, a solution that 8 wt % of polyvinyliden fluoride was previously solved into N-methylpyrolidone was employed. A carbon material made of graphite and carbon black which was previously mixed with each other, and the polyvinyliden fluoride solution were sufficiently kneaded in a weight ratio of 90:10. This slurry was coated on a single plane of a negative electrode collector 25 made of a copper foil having a thickness of 10 μm, and was dried. The negative electrode collector 25 coated with the dried negative electrode slurry was pressed by utilizing a roll press to manufacture an electrode. This electrode was punched into a disk-shaped electrode having a diameter of 16 mm to construct the negative electrode 24. The negative electrode 24 is composed of the negative electrode collector 25 and a negative electrode components layer 26 which consists of a mixture of active materials, electric conducting assisting agent, and polyvinyliden fluoride. An insulating layer 27 made of a polyethylene porous separator having a thickness of 40 μm was sandwiched between the positive electrode 21 and the negative electrode 24, and then an electrolytic solution 28 that ethylene carbonate of 1.0 mol/dm³ $LiPF_6$ and ethyl/methyl carbonate (volume ratio: 1/2) were mixed with each other was injected thereinto. It should be understood that both a positive electrode can 29 and a negative electrode can 2a are sealed by a gasket 2b, and at the same time insulated with each other. Employing both the positive electrode 21 and the negative electrode 24 used in this coin type lithium secondary battery, a 3-electrode type cell was manufactured in which a counter electrode and a reference electrode were made of metal lithium. When the cell is discharged at a constant current of current density of 0.5 mA/cm², a discharge capacity ratio, Cp2/Cp1, for the positive electrode 21 was 0.02, which was defined by the discharge capacity, Cp1, between 3.8 and 4.2 V vs. $Li/Li^+$ and the discharge capacity, Cp2, between 3.0 and 3.8 v vs. $Li/Li^+$, while another discharge capacity ratio, Cm2/Cm1, for the negative electrode 24 was 0.05, which was defined by the discharge capacity, Cm1, between 0.01 and 0.2 V vs. Li/Li$^+$ and the discharge capacity, Cm2, between 0.2 and 1 V vs. Li/Li$^+$.

Comparison Example 1

A coin type lithium secondary battery was manufactured, in which amorphous carbon having an average particle diameter of 20 μm was employed as a negative active material, and otherwise in a similar manufacturing manner to that of the embodiment 1. A discharge capacity ratio, Cm2/Cm1, of the negative electrode of this battery was 0.67.

Embodiment 2

A coin type lithium secondary battery was manufactured as a negative active material, in which graphite having an average particle diameter of 10 μm and amorphous carbon having an average particle diameter of 20 μm were mixed with each other in a weight ratio of 3:2, and otherwise in a similar manufacturing manner to that of the embodiment 1. A discharge capacity ratio, Cm2/Cm1, of the negative electrode of this battery was 0.33.

Embodiment 3

A coin type lithium secondary battery was manufactured, in which $Li_{1.05}Mn_{1.95}O_4$ having an averaged particle diameter of 20 μm and $LiMn_{1/3}Ni_{1/3}Co_{1/3}O_2$ having an averaged particle diameter of 10 μm were mixed with each other in a weight ratio of 7:3 as an electrode active material, and otherwise in a similar manufacturing manner to that of the above-described embodiment 1. A discharge capacity ratio, Cp2/Cp1, of the positive electrode of this battery was 0.33.

Embodiment 4

A coin type lithium secondary battery was manufactured, in which graphite having an average particle diameter of 1oum and amorphous carbon having an average particle diameter of 20 μm were mixed with each other in a weight ratio of 3:2 as a negative active material, and otherwise in a similar manufacturing manner to that of the embodiment 3. A discharge capacity ratio, Cm2/Cm1, of the negative electrode of this battery was 0.33.

Comparison Example 2

A coin type lithium secondary battery was manufactured, graphite having an average particle diameter of 10 μm and amorphous carbon having an average particle diameter of 20 μm were mixed with each other in a weight ratio of 1:4 as an electrode active material, and otherwise in a similar manufacturing manner to that of the embodiment 1. A discharge capacity ratio, Cm2/Cm1, of the negative electrode of this battery was 0.61.

Comparison Example 3

A coin type lithium secondary battery was manufactured, in which amorphous carbon having an average particle diameter of 20 μm was employed as a negative active material, and otherwise in a similar manufacturing manner to that of the embodiment 3.

Comparison Example 4

A coin type lithium secondary battery was manufactured, in which $Li_{1.05}Mn_{1.95}O_4$ having an average particle diameter of 20 μm and $LiMn_{1/3}Ni_{1/3}Co_{1/3}O_2$ having an average particle diameter of 10 μm were mixed with each other in a weight ratio of 3:7 as a positive active material, and otherwise in a similar manufacturing manner to that of the above-described embodiment 3. A discharge capacity ratio, Cp2/Cp1, of the positive electrode of this coin type battery was 0.8.

Cycle tests were carried out based upon the following methods by employing the coin type lithium secondary batteries indicated in Embodiment 1 to Embodiment 4, and Comparison example 1 to Comparison example 4.

Cycle Testing Method

Battery energy was charged/discharged at a temperature of 45° C. with regard to the coin type lithium secondary batteries indicated in Embodiment 1 to Embodiment 4 and Comparison example 1 to Comparison example 4 under the following conditions: A constant current/constant voltage charging operation was firstly carried out for 3 hours, in which after the batteries were charged at a constant current of current density 1 mA/cm$^2$ up to a voltage of 4.1 V, these batteries were charged at the constant voltage of 4.1 V. After the completion of charging operations, a rest time for 1 hour was secured, and then, these batteries were discharged in such a constant current of 1 mA/cm$^2$ up to a discharge termination voltage of 3 V. After the completion of discharging operations, a rest time for 2 hours was secured. A cycle test was thus carried out in which these testing operations, namely, charging→resting→discharging→resting operations, were repeatedly performed. Discharge capacity changes of the lithium secondary batteries measured in the first cycle of the above-described cycle tests were compared with discharge capacity changes measured in the 1000th cycle of the cycle tests.

In Table 1, discharge capacities of the lithium secondary batteries measured in the first cycle of the cycle test, which are described in Embodiment 1 to Embodiment 4, and Comparison example 1 to Comparison example 4, are represented by relative values when a capacity of the embodiment 1 is assumed as 1. Also, in the table 1, a ratio of a capacity measured in the 1000th cycle of the cycle test with respect to a capacity measured in the first cycle of the cycle test in each of the lithium secondary batteries is represented as a discharge capacity conservation ratio. In this case, the cycle tests were also carried out in the cases that the charging/discharging control unit 100 of the present invention was employed and was not employed, and resulting capacity conservation ratios thereof were compared with each other.

TABLE 1

| | | | discharge capacity measured in first cycle | discharge capacity conservation ratio charging/discharging control unit of present invention is employed | |
|---|---|---|---|---|---|
| | Cp2/Cpl | Cm2/Cml | | YES | NO |
| embodiment 1 | 0.02 | 0.05 | 1.00 | 78 | 43 |
| embodiment 2 | 0.02 | 0.33 | 0.95 | 81 | 56 |
| embodiment 3 | 0.33 | 0.05 | 1.15 | 72 | 37 |
| embodiment 4 | 0.33 | 0.33 | 1.10 | 76 | 49 |
| comparison example 1 | 0.02 | 0.67 | 0.60 | 83 | 77 |
| comparison example 2 | 0.02 | 0.61 | 0.67 | 78 | 49 |
| comparison example 3 | 0.33 | 0.67 | 0.70 | 79 | 71 |
| comparison example 4 | 0.80 | 0.05 | 1.20 | 59 | 35 |

In any of the lithium secondary batteries of Embodiment 1 to Embodiment 4, and Comparison example 1 to Comparison example 4, since the charging/discharging control unit 100 of the present invention was employed, the discharge capacity conservation ratios of the 1000th cycle could be improved, as compared with those obtained when the charging/discharging unit 100 was not employed. Although the discharge capacity conservation ratios of the comparison example 1 and the comparison example 3 are better even in the case that the charging/discharging control unit 100 was not employed, discharge capacities thereof are small. The discharge capacity of the comparison example 2 is small. As to the comparison example 4, although the discharge capacity of the first cycle is large, the discharge capacity is largely lowered, and even when the charging/discharging control unit 100 of the present invention is employed, the discharge capacity conservation ratio of the 1000th cycle is not sufficiently large.

Based upon the above-described cycle test results, it was confirmed that by employing the charging/discharging control unit 100 according to the present invention, the cycle lifetimes of the lithium secondary batteries could be improved. In particular, lithium secondary batteries having large discharge capacities could achieve the effect.

There is no specific restriction in utilization fields of the charging/discharging control unit 100 of the lithium secondary battery 110, according to the present invention. For example, it may be utilized as power supplies which are installed in portable information communication appliances such as a personal computer, a word processor, a cordless telephone, an electronic book player, a portable telephone, an automobile telephone, a beeper, a handy terminal, a transceiver, a portable wireless appliance; power supplies which are installed in various sorts of portable electronic appliances such as a portable copying machine, an electronic notebook, an electric calculator, a liquid crystal television, a radio, a tape recorder, a headphone stereo receiver, a portable CD player, a video movie player, an electric shaver, an electronic translating device, a voice recorder, a memory card, and the like; power supplies for domestic electric appliances such as a refrigerator, an air conditioner, a television set, a stereo receiver, a water heating device, a microwave oven, a electric dish washer, a dryer, a washing machine, a lighting device, a toy, and the like; power supplies for industrial-purpose electric apparatuses such as a medical appliance, a construction machine, an electric power storage system, an elevator, and the like; and power supplies for mobile articles such as an electric automobile, a hybrid type electric car, a golf cart, and the like.

The greatest effect may be achieved by the charging/discharging control unit 100 of the lithium secondary battery 110 according to the present invention under such a utilization condition that the lithium secondary battery 110 is charged one time per 1 day. Namely, approximately 8 hours can be secured as a time duration defined as after the discharging operation is ended, namely, after the operation of electronic appliance is ended, up to the starting of a next discharging operation, namely, until the operation of electronic appliance is commenced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A charging/discharging control unit for a lithium secondary battery, comprising:

a lithium secondary battery having a positive electrode and a negative electrode, which are capable of charging/discharging electric charges and an electrolytic solution containing lithium ions;

a voltage detecting means for detecting a voltage of said lithium secondary battery; and a current detecting means for detecting charging/discharging currents of said lithium secondary battery; wherein:

said charging/discharging control unit of the lithium secondary battery is further comprised of:

a controller for controlling a discharge voltage of said lithium secondary battery; and a discharging means for performing a constant voltage discharging operation of said lithium secondary battery; and wherein, when a voltage change value, V1-V0, of the lithium secondary battery is larger than or equal to a predetermined value, $\Delta V$, where V0 is a voltage of said lithium secondary battery at an end time of the discharging operation that is less than a reference voltage, Vcut, and V1 is a voltage of said lithium secondary battery at a time, t1, after the end time of the discharging operation, said controller causes said discharging means to perform the constant voltage discharging operation at a voltage, Vd, during a rest time until a next charging operation of the lithium secondary battery is commenced, wherein:

a positive active material of said lithium secondary battery contains a composite oxide composed of a transition metal and lithium which undertakes intercalation/deintercalation when a potential measured with a metal lithium electrode (V vs. Li/Li$^+$) is higher than or equal to 3 V, and is lower than or equal to 5 V;

a negative active material of said lithium secondary battery contains graphite having a spacing, d002, between (002) planes in a range of 0.335 to 0.349 nm as determined from an X-ray diffracting method; and within a discharge capacity when charging/discharging operations are performed between 0.01 and 1 V vs. Li/Li$^+$ by employing said negative active material in said negative electrode and said lithium metal in a counter electrode, a ratio of portions of said discharge capacity, Cm2/Cm1, of said negative electrode is in a range of Cm2/Cm1<0.4, where a portion of said discharge capacity between 0.01 to 0.2 V vs. Li/Li$^+$ is set to Cm1, and another portion of said discharge capacity between 0.2 to 1 V vs. Li/Li+ is set to Cm2.

2. A charging/discharging control unit for a lithium secondary battery as claimed in claim 1 wherein:

the positive active material of said lithium secondary battery contains a lithium-manganese composite oxide.

3. A charging/discharging control unit for a lithium secondary battery as claimed in claim 1 wherein:

the positive active material of said lithium secondary battery contains both a lithium-manganese composite oxide having spinel structure and a composite oxide containing lithium having a layer structure containing nickel and manganese; and within a discharge capacity when charging/discharging operations are performed between 0.01 and 1 V vs. Li/Li$^+$ by employing said positive active material in said positive electrode and the lithium metal in the counter electrode, a ratio of portions of said discharge capacity, Cp2/Cp1, of said positive electrode is in a range of Cp2/Cp1<0.5, where a portion of said discharge capacity between 3.8 to 4.2 2 V vs. Li/Li$^+$ is set to Cp1, and another portion of said discharge capacity between 3.0 to 3.8 V vs. Li/Li$^+$ is set to Cp2.

4. A charging/discharging control unit for a lithium secondary battery as claimed in claim 1 wherein:
- a positive active material of said lithium secondary battery contains a composite oxide composed of a transition metal and lithium which undertakes intercalation/deintercalation occurs when a potential measured with a metal lithium electrode (V vs. Li/Li$^+$) is higher than or equal to 3 V, and is lower than or equal to 5 V;
- a negative active material of said lithium secondary battery contains graphite having a spacing, d002, between (002) planes in a range of 0.335 to 0.349 nm as determined from an X-ray diffracting method, and amorphous carbon having a spacing, d002, between (002) planes in a range of 0.350 to 0.390 nm as determined from the X-ray diffracting method; and
- within a discharge capacity when charging/discharging operations are performed between 0.01 and 1 V vs. Li/Li$^+$ by employing said negative active material in said negative electrode and said lithium metal in a counter electrode, a ratio of portions of said discharge capacity, Cm2/Cm1, of said negative electrode is in a range of Cm2/Cm1<0.4, where a portion of said discharge capacity between 0.01 to 0.2 V vs. Li/Li$^+$ is set to Cm1, and another portion of said discharge capacity between 0.2 to 1 V vs. Li/Li$^+$ is set to Cm2.

5. A charging/discharging control unit for a lithium secondary battery as claimed in claim 4 wherein:
- the positive active material of said lithium secondary battery contains a lithium-manganese composite oxide.

6. A charging/discharging control unit for a lithium secondary battery as claimed in claim 4 wherein:
- the positive active material of said lithium secondary battery contains both a lithium-manganese composite oxide having spinel structure and composite oxide containing lithium having a layer structure containing nickel and manganese; and
- within a discharge capacity when charging/discharging operations are performed between 3.0 and 4.2 V vs. Li/Li$^+$ by employing said positive active material in said positive electrode and the lithium metal in the counter electrode, a ratio of portions of said discharge capacity, Cp2/Cp1, of said positive electrode is in a range of Cp2/Cp1<0.5, where a portion of said discharge capacity between 3.8 to 4.2 2 V vs. Li/Li$^+$ is set to Cp1, and another portion of said discharge capacity between 3.0 to 3.8 V vs. Li/Li$^+$ is set to Cp2.

* * * * *